(12) United States Patent
Takekuma

(10) Patent No.: US 10,532,491 B2
(45) Date of Patent: Jan. 14, 2020

(54) TWIN-SCREW EXTRUSION KNEADER WITH MOVABLE PORTIONS TO CONTROL VISCOSITY OF ELECTRODE PASTE AND MANUFACTURING METHOD FOR ELECTRODE PASTE THEREWITH

(71) Applicant: TOYOTA JIDOSHA KABUSHIKI KAISHA, Toyota-shi, Aichi-ken (JP)

(72) Inventor: Hideki Takekuma, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/714,179

(22) Filed: Sep. 25, 2017

(65) Prior Publication Data
US 2018/0093394 A1    Apr. 5, 2018

(30) Foreign Application Priority Data
Sep. 30, 2016   (JP) .................................. 2016-193840

(51) Int. Cl.
*B29B 7/48*   (2006.01)
*B29B 7/72*   (2006.01)
(Continued)

(52) U.S. Cl.
CPC ............... *B29B 7/46* (2013.01); *B29B 7/483* (2013.01); *B29B 7/488* (2013.01); *B29B 7/489* (2013.01);
(Continued)

(58) Field of Classification Search
CPC .......... B29B 7/46; B29B 7/488; B29B 7/483; B29B 7/728; B29B 7/489; B29B 7/482;
(Continued)

(56) References Cited

U.S. PATENT DOCUMENTS 3,070,836 A * 1/1963 De Haven ........... B29C 47/6037
                                                                    159/2.2
3,078,512 A * 2/1963 De Haven ........... B29C 47/6037
                                                                    159/2.2
(Continued)

FOREIGN PATENT DOCUMENTS

DE     2833057 A1 *  2/1979  ............. B29B 7/488
DE     2924269 A1 * 12/1980  ......... B29C 47/0871
(Continued)

*Primary Examiner* — Charles Cooley
(74) *Attorney, Agent, or Firm* — Sughrue Mion, PLLC

(57) ABSTRACT

A twin-screw extrusion kneader includes: two rotating shafts provided side by side in an internal space; a rotational driving portion configured to rotationally drive the rotating shafts; and paddles provided in the rotating shafts and configured to rotate along with the rotating shafts so as to knead a kneading material. Further, the twin-screw extrusion kneader includes movable portions provided as members constituting a part of the housing, the part of the housing including an inner wall surface of the housing, the inner wall surface being opposed to radially outer peripheral surfaces of the paddles. The movable portions can be moved in a direction to approach the paddles and in a direction to be distanced from the paddles. The twin-screw extrusion kneader can control the viscosity of electrode paste by moving the movable portions.

6 Claims, 7 Drawing Sheets

(51) Int. Cl.
  *B29C 48/25* (2019.01)
  *B29B 7/46* (2006.01)
  *B29C 48/57* (2019.01)
  *B29C 48/40* (2019.01)
  *B29C 48/63* (2019.01)
  *B01F 7/08* (2006.01)
  *H01M 4/04* (2006.01)

(52) U.S. Cl.
  CPC ............ B29B 7/726 (2013.01); B29C 48/268 (2019.02); *B01F 7/083* (2013.01); *B01F 7/085* (2013.01); *B29B 7/482* (2013.01); *B29C 48/402* (2019.02); *B29C 48/57* (2019.02); *B29C 48/63* (2019.02); *H01M 4/0411* (2013.01)

(58) Field of Classification Search
  CPC ..... B29B 7/726; B29C 47/00; B29C 47/0871; B29C 48/255; B29C 48/2552; B29C 48/268; B01F 7/085; B01F 7/083; H01M 4/0411
  See application file for complete search history.

(56) References Cited

U.S. PATENT DOCUMENTS

| | | | | |
|---|---|---|---|---|
| 3,158,900 | A * | 12/1964 | Heston | B29C 47/38 366/82 |
| 3,360,824 | A * | 1/1968 | Schippers | B29C 47/585 137/109 |
| 3,419,250 | A * | 12/1968 | Brennan, Jr. | B01F 15/0267 366/193 |
| 3,630,689 | A * | 12/1971 | Wheeler | B01J 19/20 366/319 |
| 3,780,994 | A * | 12/1973 | Kneller | B29C 47/38 100/148 |
| 3,870,285 | A * | 3/1975 | Bausch | A21C 1/065 366/100 |
| 3,874,090 | A * | 4/1975 | McCracken | B29B 13/06 100/145 |
| 3,981,658 | A * | 9/1976 | Briggs | B29C 47/38 425/205 |
| 4,007,545 | A * | 2/1977 | Briggs | B29C 47/38 34/397 |
| 4,103,355 | A * | 7/1978 | Weber | B29C 47/10 366/322 |
| 4,136,968 | A * | 1/1979 | Todd | B29B 7/488 366/85 |
| 4,332,481 | A * | 6/1982 | Inoue | B29B 7/465 366/301 |
| 4,380,397 | A * | 4/1983 | Hashizume | B29B 7/465 366/77 |
| 4,462,691 | A * | 7/1984 | Boguslawski | B29C 47/362 366/322 |
| 4,629,326 | A * | 12/1986 | Huls | B30B 11/248 366/307 |
| 4,629,327 | A * | 12/1986 | Capelle | B29C 47/38 366/307 |
| 4,678,339 | A * | 7/1987 | Peiffer | B29C 47/38 366/76.93 |
| 4,681,457 | A * | 7/1987 | Orimo | B29C 47/364 366/323 |
| 5,145,251 | A * | 9/1992 | Shirato | B29B 7/428 366/75 |
| 5,145,352 | A * | 9/1992 | Capelle | B29C 47/38 366/80 |
| 5,147,198 | A * | 9/1992 | Capelle | B29C 47/38 366/80 |
| 5,190,771 | A * | 3/1993 | Baumgarten | B29C 47/38 264/349 |
| 5,244,373 | A * | 9/1993 | Capelle | B29C 47/38 264/211.21 |
| 5,273,356 | A * | 12/1993 | Piccolo, Sr. | B01F 15/068 366/147 |
| 5,304,054 | A * | 4/1994 | Meyer | B29C 47/38 366/80 |
| 5,324,459 | A * | 6/1994 | Klein | B29C 47/38 264/211.21 |
| 5,335,991 | A * | 8/1994 | Wobbe | B29C 47/0871 366/79 |
| 5,362,146 | A * | 11/1994 | Nogossek | B29C 47/38 366/307 |
| 5,382,089 | A * | 1/1995 | Mosher | B29B 7/48 366/83 |
| 5,590,959 | A * | 1/1997 | Ueda | B01F 15/00922 366/322 |
| 5,672,005 | A * | 9/1997 | Fukui | B29B 7/465 366/75 |
| 5,829,872 | A * | 11/1998 | Mizuguchi | B29B 7/46 366/77 |
| 5,836,680 | A * | 11/1998 | Banas | B29C 47/38 366/80 |
| 5,890,801 | A * | 4/1999 | Mizuguchi | B29B 7/46 366/194 |
| 6,238,079 | B1 * | 5/2001 | Watada | B29C 47/404 366/80 |
| 6,280,074 | B1 * | 8/2001 | Kuroda | B29B 7/246 366/76.3 |
| 6,607,299 | B1 * | 8/2003 | Bacher | B29C 47/684 366/87 |
| 7,635,217 | B2 * | 12/2009 | Rokey | B29B 7/481 366/80 |
| 7,637,650 | B2 * | 12/2009 | Ueda | B29B 7/465 198/675 |
| 7,677,787 | B2 * | 3/2010 | Yamane | B01F 7/082 366/80 |
| 7,802,915 | B2 * | 9/2010 | Yamada | B29B 7/484 366/80 |
| 8,079,747 | B2 * | 12/2011 | Ek | B29B 7/465 366/80 |
| 8,118,475 | B2 * | 2/2012 | Yamada | B29B 7/484 366/80 |
| 9,463,581 | B2 * | 10/2016 | Yamaguchi | B29B 7/421 |
| 9,630,344 | B2 * | 4/2017 | Kono | B29B 7/18 |
| 10,137,600 | B2 * | 11/2018 | Ogane | B01F 7/083 |
| 2002/0186612 | A1 * | 12/2002 | Murakami | B29C 47/0019 366/79 |
| 2004/0257903 | A1 * | 12/2004 | Ueda | B29B 7/465 366/77 |
| 2007/0237022 | A1 * | 10/2007 | Wiltz | B29C 47/0871 366/80 |
| 2007/0237850 | A1 * | 10/2007 | Wiltz | B29C 47/0023 425/114 |
| 2009/0122636 | A1 * | 5/2009 | Yamane | B01F 7/082 366/76.93 |
| 2009/0175120 | A1 * | 7/2009 | Rokey | B29B 7/481 366/132 |
| 2009/0213681 | A1 * | 8/2009 | Ek | B29B 7/465 366/76.1 |
| 2010/0110822 | A1 * | 5/2010 | Yamada | B29B 7/484 366/76.93 |
| 2010/0271901 | A1 * | 10/2010 | Yamaguchi | B29B 7/421 366/79 |
| 2010/0309745 | A1 * | 12/2010 | Yamada | B29B 7/484 366/89 |
| 2016/0052171 | A1 * | 2/2016 | Ogane | B01F 7/083 366/83 |
| 2018/0093394 | A1 * | 4/2018 | Takekuma | B29B 7/46 |

FOREIGN PATENT DOCUMENTS

| | | | | |
|---|---|---|---|---|
| DE | 4223043 | A1 * | 1/1994 | ......... B29C 47/0871 |
| DE | 19931342 | A1 * | 1/2001 | ............ B29C 47/38 |
| EP | 0342839 | A2 * | 11/1989 | ............ B29B 7/428 |
| EP | 0391003 | A2 * | 10/1990 | ............ B29B 7/488 |
| EP | 3495107 | A1 * | 6/2019 | .............. B29B 7/46 |
| GB | 2033241 | A * | 5/1980 | ............ B29B 7/488 |
| JP | 57187022 | A * | 11/1982 | ............ B29B 7/488 |

(56) References Cited

FOREIGN PATENT DOCUMENTS

| JP | 62-33422 U | 2/1987 | |
|---|---|---|---|
| JP | 02048920 A * | 2/1990 | ............. B29B 7/428 |
| JP | 02092516 A * | 4/1990 | ............. B29B 7/428 |
| JP | 02099305 A * | 4/1990 | ............ B29C 47/667 |
| JP | 02263609 A * | 10/1990 | ............. B29B 7/488 |
| JP | 04028505 A * | 1/1992 | ............. B29B 7/482 |
| JP | 5-50425 A | 3/1993 | |
| JP | 5-220368 A | 8/1993 | |
| JP | 06155550 A * | 6/1994 | ......... B29C 47/0871 |
| JP | H0643060 B2 * | 6/1994 | ............. B29B 7/482 |
| JP | 07195359 A * | 8/1995 | ............. B29B 7/488 |
| JP | 08001661 A * | 1/1996 | ............. B29B 7/465 |
| JP | 10305422 A * | 11/1998 | ............. B29C 47/40 |
| JP | 2000309017 A * | 11/2000 | ............. B29C 47/64 |
| JP | 3220316 B2 * | 10/2001 | ............. B29B 7/488 |
| JP | 2002028963 A * | 1/2002 | ............ B29C 47/367 |
| JP | 3400674 B2 * | 4/2003 | ............. B29C 47/40 |
| JP | 2007015348 A * | 1/2007 | ............. B01F 7/082 |
| JP | 2009113246 A * | 5/2009 | ............. B29B 7/421 |
| JP | 2009178918 A * | 8/2009 | ............. B29B 7/484 |
| JP | 2010105296 A * | 5/2010 | ............. B29B 7/484 |
| JP | 2014-161778 A | 9/2014 | |
| WO | WO-2009057753 A1 * | 5/2009 | ............. B29B 7/421 |
| WO | 2014/147791 A1 | 9/2014 | |

* cited by examiner

TWIN-SCREW EXTRUSION KNEADER WITH MOVABLE PORTIONS TO CONTROL VISCOSITY OF ELECTRODE PASTE AND MANUFACTURING METHOD FOR ELECTRODE PASTE THEREWITH

INCORPORATION BY REFERENCE

The disclosure of Japanese Patent Application No. 2016-193840 filed on Sep. 30, 2016 including the specification, drawings and abstract is incorporated herein by reference in its entirety.

BACKGROUND

1. Technical Field

The present disclosure relates to a twin-screw extrusion kneader and a manufacturing method for an electrode paste by use of the twin-screw extrusion kneader.

2. Description of Related Art

Positive and negative electrode plates used in a secondary battery such as a lithium-ion secondary battery are manufactured such that an electrode mixture layer is formed on a surface of a current collector foil. The electrode mixture layer may be formed such that an electrode paste including materials (an electrode mixture material) for forming the electrode mixture layer is applied on the current collector foil and then a solvent in the electrode paste is removed. The electrode paste for use in the formation of the electrode mixture layer can be manufactured by kneading the electrode mixture material with the solvent.

For example, the kneading to manufacture the electrode paste can be performed by use of a twin-screw extrusion kneader described in International Publication No. 2014/147791. The twin-screw extrusion kneader is a device that can knead an electrode mixture material and a solvent supplied into an internal space of a housing by rotation of a paddle. According to International Publication No. 2014/147791, a paste having a target viscosity can be manufactured by performing the kneading by the twin-screw extrusion kneader in which a gap between an outer peripheral surface of the paddle and an inner wall surface of the housing is set to satisfy a predetermined relationship.

SUMMARY

In the meantime, in the twin-screw extrusion kneader, it is not easy to maintain the gap between the outer peripheral surface of the paddle and the inner wall surface of the housing to a uniform size all the time. That is, at the time of kneading, the outer peripheral surface of the paddle and the inner wall surface of the housing are worn due to the contact with a kneading material to be kneaded. On this account, the twin-screw extrusion kneader has such a problem that, every time the paste is manufactured, the size of the gap between the outer peripheral surface of the paddle and the inner wall surface of the housing increases. As such, it is difficult to continue manufacturing the paste having a target viscosity while the gap between the outer peripheral surface of the paddle and the inner wall surface of the housing is maintained to a uniform size.

The present disclosure is to provide a twin-screw extrusion kneader that can adjust a size of a gap between an outer peripheral surface of a paddle and an inner wall surface of a housing, and a manufacturing method for an electrode paste therewith.

A first aspect of the present disclosure provides a twin-screw extrusion kneader for kneading a kneading material supplied to an internal space of a housing, and the twin-screw extrusion kneader includes: two rotating shafts provided side by side in the internal space; a rotational driving portion configured to rotationally drive the rotating shafts; paddles provided in the rotating shafts and configured to rotate along with the rotating shafts so as to knead the kneading material; and movable portions provided as members constituting a part of the housing, the part of the housing including an inner wall surface of the housing, the inner wall surface being opposed to radially outer peripheral surfaces of the paddles, the movable portions being configured to move in a direction to approach the paddles and in a direction to be distanced from the paddles.

In the first aspect of the present disclosure, the movable portions can be moved in the direction to approach the paddles and in the direction to be distanced from the paddles. Accordingly, a gap between an outer peripheral surface of the paddle and the inner wall surface of the housing can be adjusted.

Further, in the first aspect, the twin-screw extrusion kneader may include: position adjustment portions configured to perform position adjustment on the movable portions by moving the movable portions; and a viscosity index value output portion configured to output a viscosity index value indicative of a viscosity of the kneading material. The position adjustment portions may perform the position adjustment on the movable portions based on the viscosity index value output from the viscosity index value output portion. This is because the viscosity can be adjusted in accordance with a state of the kneading material during the kneading.

Further, in the first aspect, the paddles may be provided in a predetermined zone along an axial direction of the rotating shafts, and the movable portions may be provided on an upstream side in a conveying direction of the kneading material in the predetermined zone.

Further, a second aspect of the present disclosure is a manufacturing method for an electrode paste by use of a twin-screw extrusion kneader for kneading a kneading material supplied to an internal space of a housing, and the manufacturing method includes: manufacturing the electrode paste by the twin-screw extrusion kneader by use of an active material, a binder, and a solvent as the kneading material, the twin-screw extrusion kneader used in the manufacturing method including: two rotating shafts provided side by side in the internal space; a rotational driving portion configured to rotationally drive the rotating shafts; paddles provided in the rotating shafts and configured to rotate along with the rotating shafts so as to knead the kneading material; and movable portions provided as members constituting a part of the housing, the part of the housing including an inner wall surface of the housing, the inner wall surface being opposed to radially outer peripheral surfaces of the paddles, the movable portions being configured to move in a direction to approach the paddles and in a direction to be distanced from the paddles.

In the second aspect, the twin-screw extrusion kneader used in the manufacturing method may include: position adjustment portions configured to perform position adjustment on the movable portions by moving the movable portions; and a viscosity index value output portion configured to output a viscosity index value indicative of a viscosity of the kneading material, and the position adjustment portion may perform the position adjustment on the movable portions based on the viscosity index value output from the viscosity index value output portion.

In the second aspect, the twin-screw extrusion kneader used in the manufacturing method may be configured such that the paddles are provided in a predetermined zone along an axial direction of the rotating shafts, and the movable portions are provided on an upstream side in a conveying direction of the kneading material in the predetermined zone.

The present disclosure provides the twin-screw extrusion kneader that can adjust a size of a gap between the outer peripheral surface of the paddle and the inner wall surface of the housing, and the manufacturing method for an electrode paste therewith.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The following describes a best mode for embodying the present disclosure in detail with reference to the drawings.

First Embodiment

Figure 1:
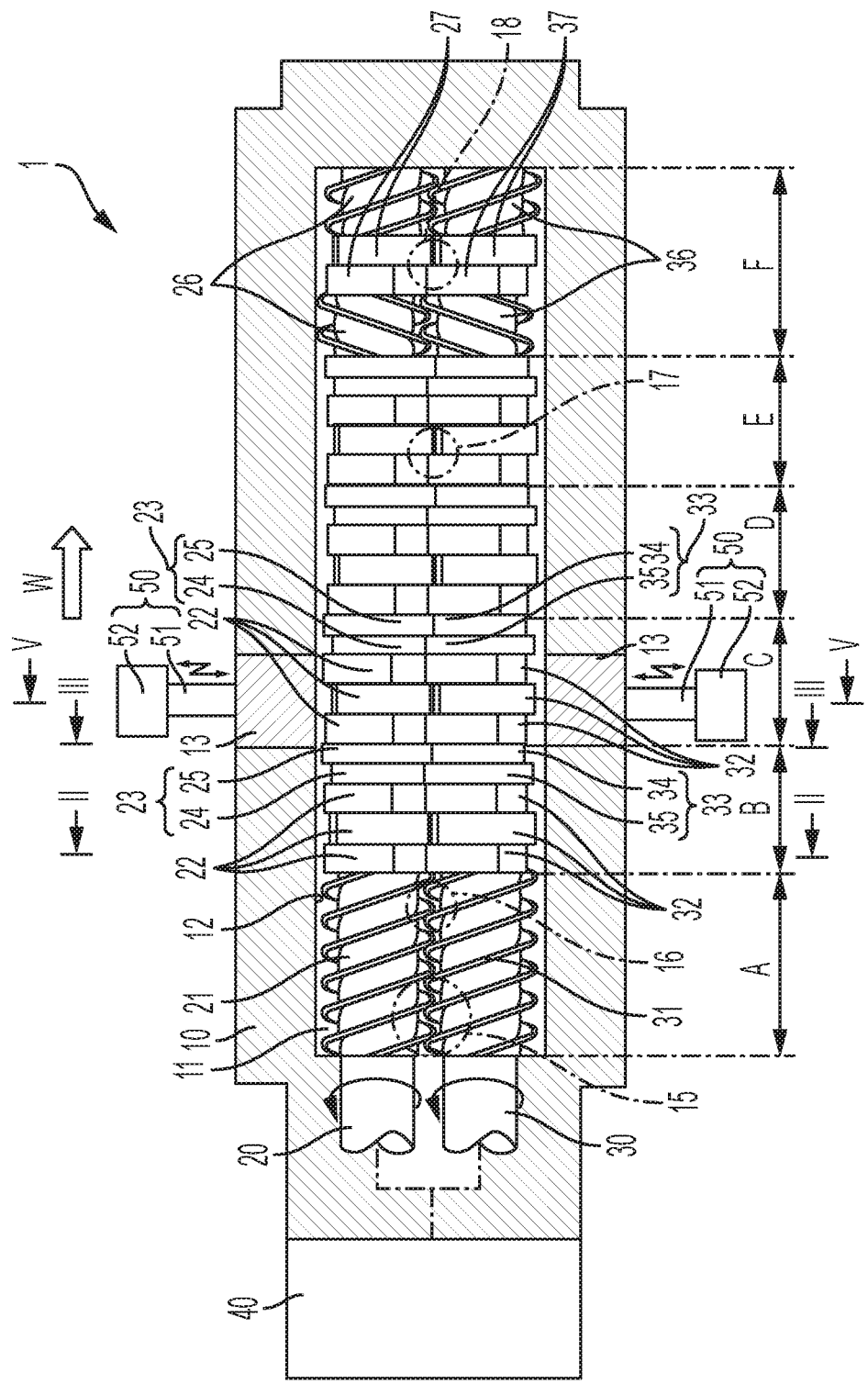
FIG. 1 is a schematic configuration diagram of a twin-screw extrusion kneader according to a first embodiment.
Figure 2:
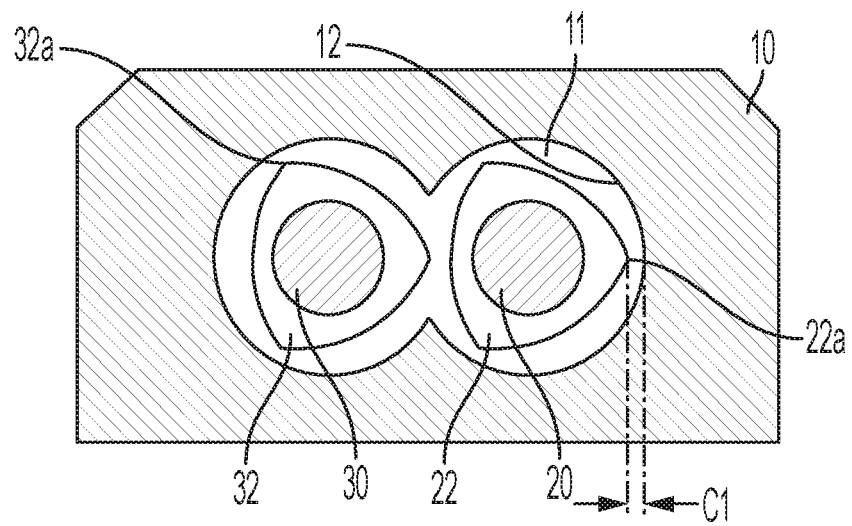
FIG. 2 is a sectional view taken along a line II-II in FIG. 1.
Figure 3:
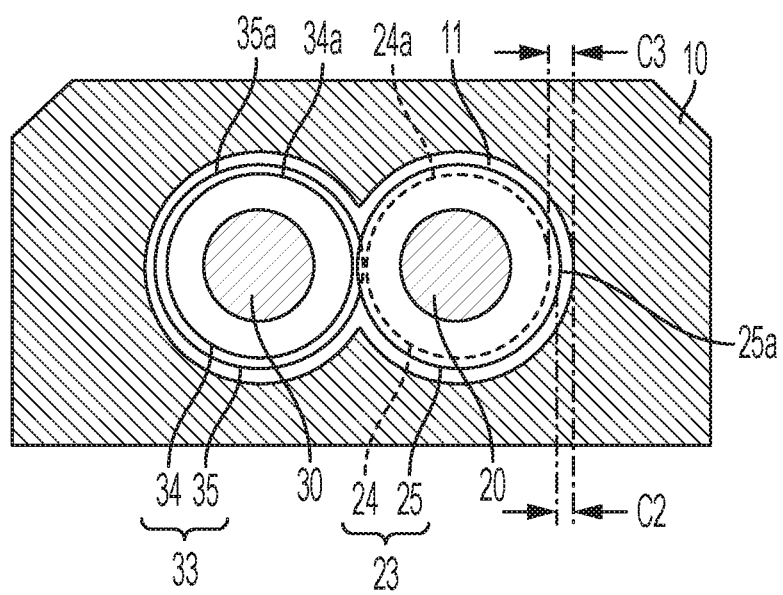
FIG. 3 is a sectional view taken along a line III-III in FIG. 1.

FIG. 1 illustrates a twin-screw extrusion kneader 1 according to the first embodiment. Further, FIG. 2 is a sectional view at a II-II position illustrated in FIG. 1, and FIG. 3 is a sectional view at a III-III position illustrated in FIG. 1. The twin-screw extrusion kneader 1 can manufacture a paste by kneading a kneading material as an object to be kneaded. The present embodiment describes a case where a negative electrode paste used to form a negative electrode mixture layer of a negative plate for a lithium-ion secondary battery is manufactured by the twin-screw extrusion kneader 1.

As illustrated in FIG. 1, the twin-screw extrusion kneader 1 includes a housing 10, rotating shafts 20, 30, a rotational driving portion 40. An internal space 11 is formed inside the housing 10. That is, the housing 10 has an inner wall surface 12 surrounding the internal space 11 from outside. Further, as illustrated in FIG. 2 or 3, the internal space 11 formed in the housing 10 has a shape in which two circular-column-shaped spaces partially overlap each other.

Further, as indicated by an alternate long and two short dashes line in FIG. 1, the housing 10 has a first supply port 15, a second supply port 16, a third supply port 17, and a discharge port 18. The first supply port 15, the second supply port 16, the third supply port 17, and the discharge port 18 are through-holes penetrating through the inner wall surface 12 from the outside of the housing 10.

The first supply port 15, the second supply port 16, and the third supply port 17 supply respective materials for manufacturing a negative electrode paste to the internal space 11 of the housing 10. That is, in the present embodiment, all the materials for manufacturing the negative electrode paste are the kneading material as the object to be kneaded. Further, the discharge port 18 discharges the kneading material kneaded in the internal space 11 of the housing 10 from the internal space 11 of the housing 10. The kneading material thus kneaded and discharged from the discharge port 18 is a negative electrode paste.

In the present embodiment, as the materials for manufacturing the negative electrode paste, an active material, a binder, and a solvent are used. That is, the kneading material in the present embodiment includes the active material, the binder, and the solvent. In the kneading material, the active material and the binder are supplied from the first supply port 15 to the internal space 11. The solvent is supplied to the internal space 11 from the second supply port 16 and the third supply port 17. Respective materials thus supplied from the first supply port 15, the second supply port 16, and the third supply port 17 are kneaded while being conveyed in a conveying direction indicated by an arrow W illustrated in FIG. 1 in the twin-screw extrusion kneader 1, and then discharged from the discharge port 18 as the negative electrode paste.

In the twin-screw extrusion kneader 1 of the present embodiment, the rotating shafts 20, 30 are provided in the housing 10 so as to be arranged side by side in parallel to each other, as illustrated in FIG. 1. Further, the rotating shafts 20, 30 extend in an axial direction from one end side of the internal space 11 of the housing 10 to the other end side thereof. Further, as illustrated in the sectional view in FIG. 2 or 3, the rotating shafts 20, 30 are provided at respective central positions of two circular column shapes forming the internal space 11.

The rotational driving portion 40 is a drive source for rotating the rotating shafts 20, 30 in a direction indicated by an arrow in FIG. 1. In the present embodiment, a motor is used as the rotational driving portion 40. Further, in the present embodiment, as illustrated in FIG. 1, the rotating shafts 20, 30 are rotated together by a driving force generated by the rotational driving portion 40. A mechanism for transmitting the driving force from the rotational driving portion 40 to the rotating shafts 20, 30 can be constituted by use of gear wheels, for example.

Further, as illustrated in FIG. 1, the housing 10 has a feeding zone A, a wet zone B, a first thick-kneading zone C, a second thick-kneading zone D, a dilution zone E, and a discharge zone F from an upstream side toward a downstream side in the conveying direction. The first supply port 15 and the second supply port 16 are provided in the feeding zone A, the third supply port 17 is provided in the dilution zone E, and the discharge port 18 is provided in the discharge zone F. Further, in these zones, the rotating shafts 20, 30 are provided with a plurality of screws and paddles.

More specifically, the rotating shafts 20, 30 in the feeding zone A are provided with feed screws 21, 31, respectively.

The feed screws 21, 31 can both convey the kneading material supplied to the internal space 11 in the conveying direction by rotation.

The rotating shafts 20, 30 in the wet zone B, the first thick-kneading zone C, the second thick-kneading zone D, and the dilution zone E are provided with respective first paddles 22, 32 and respective second paddles 23, 33. Further, in the wet zone B, the first thick-kneading zone C, the second thick-kneading zone D, and the dilution zone E, the first paddles 22, 32 are placed at the same position and the second paddles 23, 33 are placed at the same position.

As illustrated in the sectional view of FIG. 2, the first paddles 22, 32 have a triangular shape with round sides (curved sides). On this account, a gap between the first paddle 22, 32 and the inner wall surface 12 of the housing 10 is narrowest at a vertex portion most projecting radially outwardly from the first paddle 22, 32. FIG. 2 illustrates a size C1 of the narrowest gap between the inner wall surface 12 of the housing 10 and an outer peripheral surface 22a, 32a at the vertex portion of the first paddle 22, 32. The first paddles 22, 32 can perform kneading while applying a shear force to the kneading material.

The second paddles 23, 33 include respective second small paddles 24, 34 and respective second large paddles 25, 35. The second paddles 23, 33 are configured such that the second small paddle 24 and the second large paddle 25 are placed in a reverse order to the second small paddle 34 and the second large paddle 35 in the conveying direction. Further, the second small paddles 24, 34 and the second large paddles 25, 35 have a round shape as illustrated in the sectional view of FIG. 3. Note that the second small paddles 24, 34 have a diameter smaller than the second large paddles 25, 35. On this account, a gap C2 between the second large paddle 25, 35 and the inner wall surface 12 of the housing 10 is smaller than a gap C3 between the second small paddle 24, 34 and the inner wall surface 12 of the housing 10. FIG. 3 illustrates the comparative sizing of the gaps C2 and C3. A size C2 of the gap C2 is illustrated between an outer peripheral surface 25a, 35a of the second large paddle 25, 35 and the inner wall surface 12 of the housing 10. A size of the gap C3 is illustrated between an outer peripheral surface 24a, 34a of the small paddle 24, 34 and the inner wall surface 12 of the housing 10. The second paddles 23, 33 can adjust a moving speed of the kneading material toward the downstream side in the conveying direction.

The rotating shafts 20, 30 in the discharge zone F are provided with respective discharge screw pairs 26, 36 and respective third paddles 27, 37. The discharge screw pairs 26, 36 are provided so as to sandwich the third paddles 27, 37. Further, the discharge screw pairs 26, 36 can convey the kneading material in the discharge zone F by rotation toward the third paddles 27, 37. Further, as illustrated in FIG. 1, the third paddles 27, 37 are provided at a position of the discharge port 18 in the conveying direction. Hereby, the discharge screw pairs 26, 36 and the third paddles 27, 37 can convey the kneading material in the discharge zone F by rotation toward the discharge port 18.

At the time when a negative electrode paste is manufactured by the twin-screw extrusion kneader 1, the rotational driving portion 40 rotates the rotating shafts 20, 30. Hereby, the screws and the paddles provided in the rotating shafts 20, 30 are rotated. Further, at the time when the negative electrode paste is manufactured, the materials for manufacturing the negative electrode paste are supplied from the first supply port 15, the second supply port 16, and the third supply port 17 to the internal space 11 of the housing 10.

The kneading material supplied to the feeding zone A from the first supply port 15 and the second supply port 16 is conveyed toward the conveying direction by the feed screws 21, 31. Hereby, the kneading material is supplied continuously from the first supply port 15 and the second supply port 16, so that the kneading material in the internal space 11 is conveyed in the conveying direction.

The kneading material passing through the feeding zone A reaches the wet zone B. The materials are mixed in the wet zone B. That is, in the wet zone B, solid contents such as the active material are mixed with the solvent, so as to become a wet state. The kneading material passing through the wet zone B passes through the first thick-kneading zone C and the second thick-kneading zone D in this order. In the first thick-kneading zone C and the second thick-kneading zone D, the kneading material in the wet state is kneaded by the first paddles 22, 32.

Then, in the dilution zone E, the solvent is further supplied from the third supply port 17. Accordingly, the kneading material is diluted by the solvent thus supplied. Due to the dilution in the dilution zone E, a ratio of the solid contents in the kneading material is adjusted to a final ratio. Further, the ratio of the solid contents in the kneading material is adjusted, so that a viscosity of the kneading material is decreased to a final viscosity. Hereby, the negative electrode paste is manufactured. Then, the negative electrode paste manufactured in the dilution zone E is discharged from the discharge port 18 in the discharge zone F placed further on the downstream side.

Figure 4:
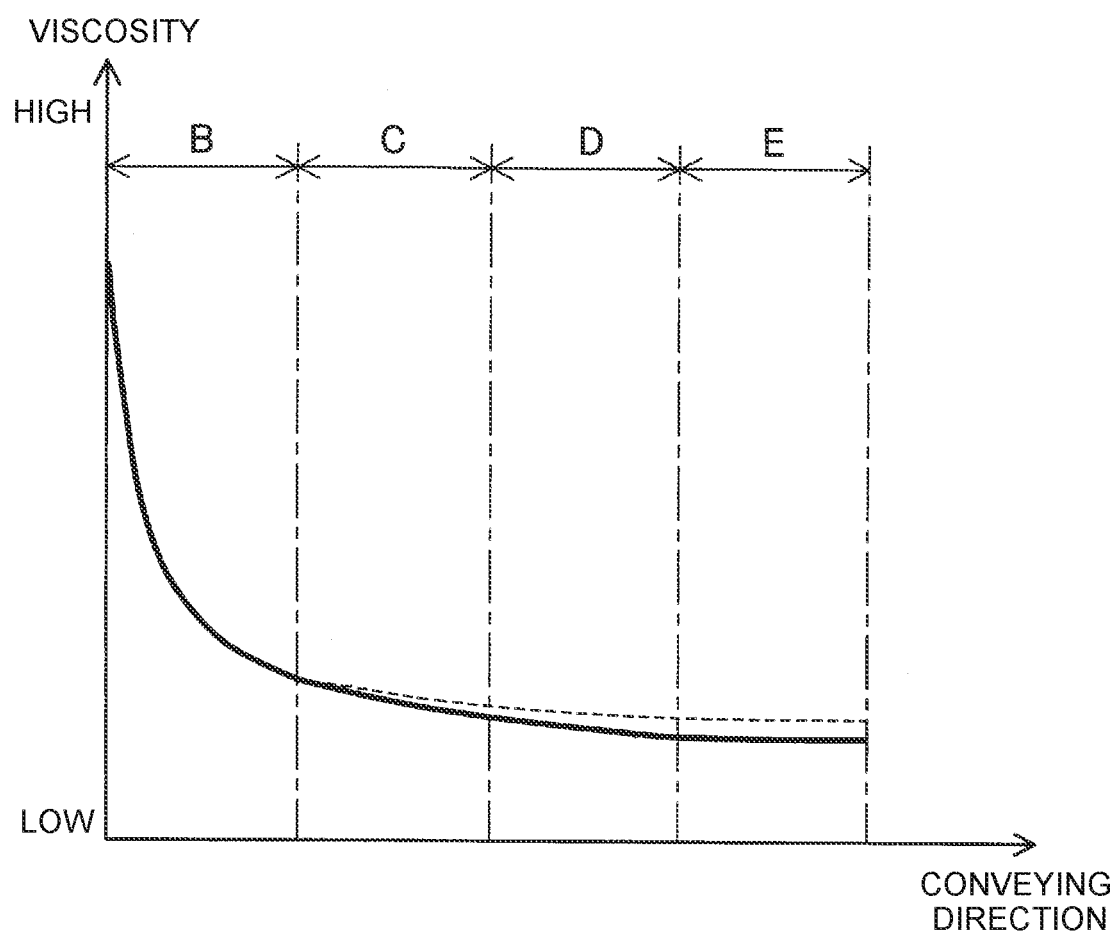
FIG. 4 is a view illustrating a viscosity of a kneading material in each zone in a conveying direction.

In FIG. 4, a transition of the viscosity of the kneading material conveyed in the internal space 11 in the wet zone B, the first thick-kneading zone C, the second thick-kneading zone D, and the dilution zone E is indicated by a continuous line. That is, as illustrated in FIG. 4, the viscosity of the kneading material decreases from the wet zone B to the dilution zone E as kneading proceeds. The negative electrode paste has a final target viscosity at a downstream position in the conveying direction in the dilution zone E.

Here, even in a case where a negative electrode paste is formed by use of the same kneading material under the same environment by the twin-screw extrusion kneader described above, the negative electrode paste to be manufactured may have a different viscosity. The reason is as follows. That is, as the kneading material is kneaded, the first paddle and the housing are worn due to the contact with the kneading material. When such abrasion occurs, the gap between the outer peripheral surface of the first paddle and the inner wall surface of the housing becomes large. As the gap between the outer peripheral surface of the first paddle and the inner wall surface of the housing becomes larger, a shear force to be applied to the kneading material becomes weaker.

In FIG. 4, a transition of the viscosity of the negative electrode paste manufactured in a state where the first paddle and the housing are worn more than the case indicated by the continuous line is indicated by a broken line. As indicated by the broken line in FIG. 4, the negative electrode paste manufactured in the state where the first paddle and the housing are worn more than the case indicated by the continuous line has a higher viscosity. That is, from FIG. 4, it is found that the negative electrode paste cannot be manufactured continuously with a uniform quality because the gap becomes larger due to the abrasion of the first paddle and the housing. Further, in the twin-screw extrusion kneader configured as described above, the first paddle provided in the first thick-kneading zone where the kneading material in the wet state is kneaded by applying a shear force thereto is one of members that tend to be most easily worn.

In view of this, the twin-screw extrusion kneader 1 of the present embodiment is configured to adjust the size C1 of the gap between the first paddles 22, 32 and the housing 10 in the first thick-kneading zone C. More specifically, the housing 10 of the twin-screw extrusion kneader 1 of the present embodiment includes movable portions 13 provided at a position corresponding to the first paddles 22, 32 in the first thick-kneading zone C in the conveying direction. More specifically, the movable portion 13 is a member constituting a part of the housing 10, including the inner wall surface 12 of the housing 10, the inner wall surface 12 being opposed to the outer peripheral surface of the first paddle 22, 32. Hereby, the movable portion 13 can move in a direction to approach the first paddle 22, 32 and a direction to be distanced therefrom.

Further, the twin-screw extrusion kneader 1 of the present embodiment includes adjustment portions 50 for adjusting moving positions of the movable portions 13. The adjustment portion 50 includes a converter 51 connected to the movable portion 13, and a motor 52 connected to the converter 51. The motor 52 can generate a driving force of a rotational motion. The converter 51 can convert the rotational motion generated by the motor 52 into a linear motion and move the movable portion 13 in the direction to approach the first paddle 22, 32 and the direction to be distanced therefrom. As the converter 51, a ball screw can be used, for example. Note that the adjustment portion 50 also includes a controlling portion for controlling rotation of the motor 52.

Figure 5:
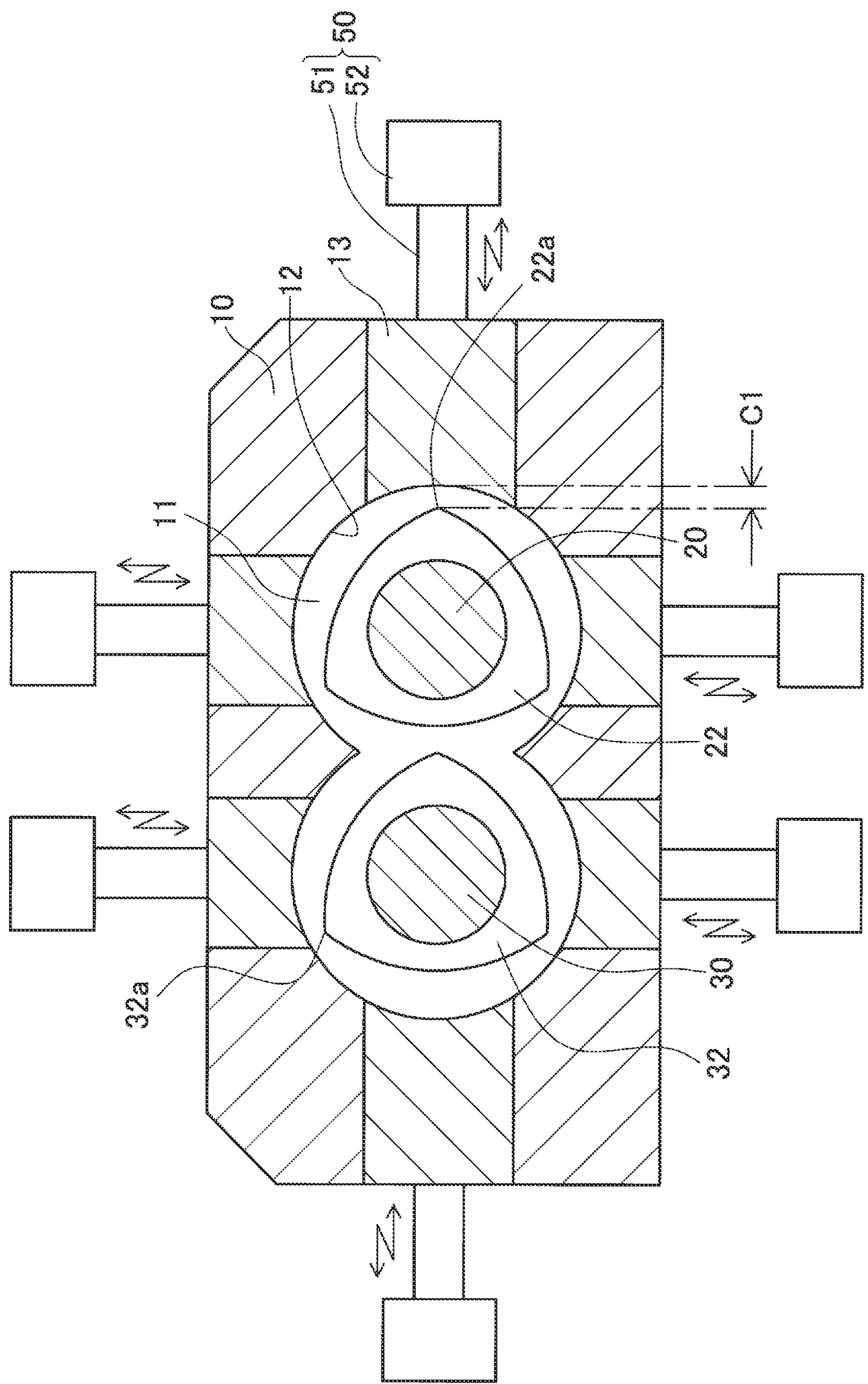
FIG. 5 is a sectional view taken along a line V-V in FIG. 1.

FIG. 5 is a sectional view at a V-V position in FIG. 1. That is, FIG. 5 is a sectional view in a plane perpendicular to the axial direction of the rotating shafts 20, 30 at the position of the movable portion 13. In the twin-screw extrusion kneader 1 of the present embodiment, a plurality of movable portions 13 and a plurality of adjustment portions 50 are provided so as to be arranged as illustrated in FIG. 5. However, the arrangement of the movable portions 13 and the adjustment portions 50 is not limited to the arrangement illustrated in FIG. 5. Further, it is preferable that a sealing member be provided on a sliding surface between the movable portion 13 and a body portion of the housing 10. This is to prevent the kneading material from leaking from the housing 10.

In the twin-screw extrusion kneader 1 of the present embodiment, a distance between the movable portion 13 and the first paddle 22, 32 of the first thick-kneading zone C can be adjusted by the adjustment portion 50. That is, the size C1 of the gap between the inner wall surface 12 of the housing 10 and the first paddle 22, 32 at a position of the movable portion 13 can be adjusted. Accordingly, in the present embodiment, in a case where the abrasion of the first paddle 22, 32 in the first thick-kneading zone C progresses, the movable portion 13 is moved closer to the first paddle 22, 32 by the adjustment portion 50, so that the size C1 of the gap at the position can be maintained to the same size as the size C1 before the abrasion progresses. Hereby, the twin-screw extrusion kneader 1 of the present embodiment can manufacture the negative electrode paste with a uniform quality for a long term.

Note that, in a case where the abrasion of the first paddle 22, 32 progresses, the size C1 of the gap can be set to a size as originally designed by replacing the first paddle 22, 32 thus worn. However, in order to replace the first paddle 22, 32, a cost to manufacture a new first paddle 22, 32 for the replacement is required.

Further, since the housing 10 is also worn, it is be difficult to set the size C1 of the gap to the size as originally designed, only by the replacement of the first paddle 22, 32. This is because it is necessary to redesign and manufacture the first paddle 22, 32 for the replacement so as to have a larger outer shape just by the abrasion of the housing 10. That is, it is also necessary to replace the housing 10, which also requires a cost to newly manufacture a housing 10 for the replacement, which is more expensive than the first paddle 22, 32. Further, in order to replace the first paddles 22, 32 and the housing 10, the manufacture of the negative electrode paste must be stopped during the replacement, which also causes a problem that productivity decreases.

In this regard, in the twin-screw extrusion kneader 1 of the present embodiment, the size C1 of the gap can be set to the size as originally designed by adjusting the position of the movable portion 13 by the adjustment portion 50. This does not cause the costs to manufacture a new first paddles 22, 32 for the replacement and a new housing 10 for the replacement. Accordingly, it is possible to reduce a running cost and to manufacture the negative electrode paste with a uniform quality for a long term. Further, since it is not necessary to replace the first paddles 22, 32 and the housing 10, the productivity of the negative electrode paste does not decrease. That is, it is possible to manufacture the negative electrode paste at a low cost while maintaining a high productivity.

Note that the above description deals with the twin-screw extrusion kneader 1 in which the movable portions 13 and the adjustment portions 50 are placed at the position corresponding to the first paddles 22, 32 in the first thick-kneading zone C. This is because, as described above, the abrasion of the first paddles 22, 32 and the housing 10 particularly easily progresses at the position of the first paddles 22, 32 in the first thick-kneading zone C.

However, also in the wet zone B, the abrasion of the first paddles 22, 32 and the housing 10 tends to easily progress. This is because, in a zone where a high shear force is applied in a state where the viscosity of the kneading material is high, the first paddles 22, 32 and the housing 10 are easily worn. Therefore, the configuration of the movable portion 13 and the adjustment portion 50 may be provided in the wet zone B, so as to adjust the size C1 of the gap between the first paddle 22, 32 and the housing 10 in the wet zone B. Further, for example, the movable portion 13 and the adjustment portion 50 may be provided both in the wet zone B and in the first thick-kneading zone C. Further, naturally, the abrasion also occurs in the other zones although the abrasion is small as compared with the abrasion in the wet zone B and the first thick-kneading zone C. Therefore, a configuration similar to the movable portion 13 and the adjustment portion 50 may be also provided in the other zones in addition to the wet zone B and the first thick-kneading zone C, so as to adjust the size C1 of the gap between the first paddle 22, 32 and the housing 10.

Further, as the kneading of the kneading material is continuously performed, the second paddle 23, 33 and the inner wall surface 12 of the housing 10, which is opposed to the second paddle 23, 33, are also worn, although the abrasion is small as compared with the first paddle 22, 32 and the inner wall surface 12 of the housing 10, which is opposed to the first paddle 22, 32. When the abrasion of the second paddle 23, 33 and the inner wall surface 12 of the housing 10, opposed to the second paddle 23, 33, progresses, the size C2 of the gap therebetween becomes larger, which speeds up the movement of the kneading material toward the downstream side. That is, the kneading material might be conveyed to a next zone while the kneading of the kneading material is insufficient. Therefore, with the use of the configuration similar to the above, the size C2 of the gap can be adjusted in terms of the second paddle 23, 33.

Further, in the above description, the adjustment portion 50 is constituted by the converter 51 and the motor 52. However, the adjustment portion 50 may be configured in another manner provided that the adjustment portion 50 can move the movable portion 13 in the direction to approach the first paddle 22, 32 and in the direction to be distanced from the first paddle 22, 32. That is, as the adjustment portion 50, it is possible to employ a cylinder that works by a pneumatic pressure or a hydraulic pressure, for example, other than the configuration described above. Further, for example, in a case where an operator adjusts a position of the movable portion 13, the adjustment portion 50 is unnecessary.

Second Embodiment

Next will be described the second embodiment. In the present embodiment, position adjustment of a movable portion of a housing by an adjustment portion is performed based on a value indicative of a viscosity of a kneading material at the time of kneading.

Figure 6:
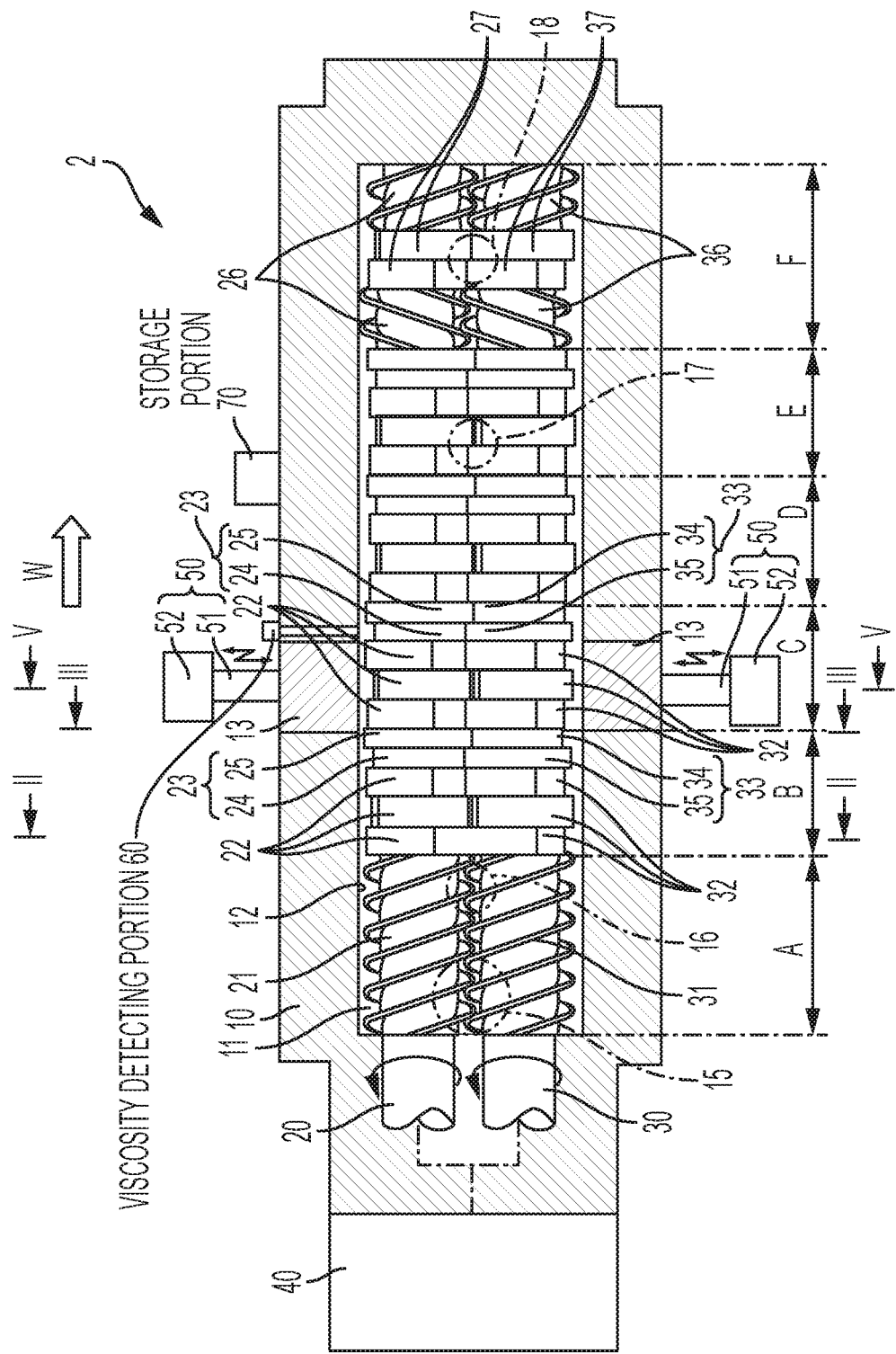
FIG. 6 is a schematic configuration diagram of a twin-screw extrusion kneader according to a second embodiment.

FIG. 6 illustrates a twin-screw extrusion kneader 2 according to the second embodiment. The twin-screw extrusion kneader 2 of the present embodiment includes a viscosity detecting portion 60 and a storage portion 70 in addition to the configuration of the twin-screw extrusion kneader 1 of the first embodiment. The other configuration is the same as the configuration of the twin-screw extrusion kneader 1 of the first embodiment.

The viscosity detecting portion 60 is provided in a first thick-kneading zone C. More specifically, the viscosity detecting portion 60 is provided so that its detecting position is positioned on a downstream side relative to first paddles 22, 32 in the first thick-kneading zone C. The viscosity detecting portion 60 is a viscometer that can detect and output a viscosity of a kneading material at the detecting position.

The storage portion 70 stores a set range for the viscosity of the kneading material. More specifically, the storage portion 70 stores the set range for the viscosity of the kneading material at the detecting position of the viscosity detecting portion 60. The set range for the viscosity, stored in the storage portion 70, is obtained in advance and stored in the storage portion 70 before the manufacture of a negative electrode paste by the twin-screw extrusion kneader 2 is started.

Figure 7:
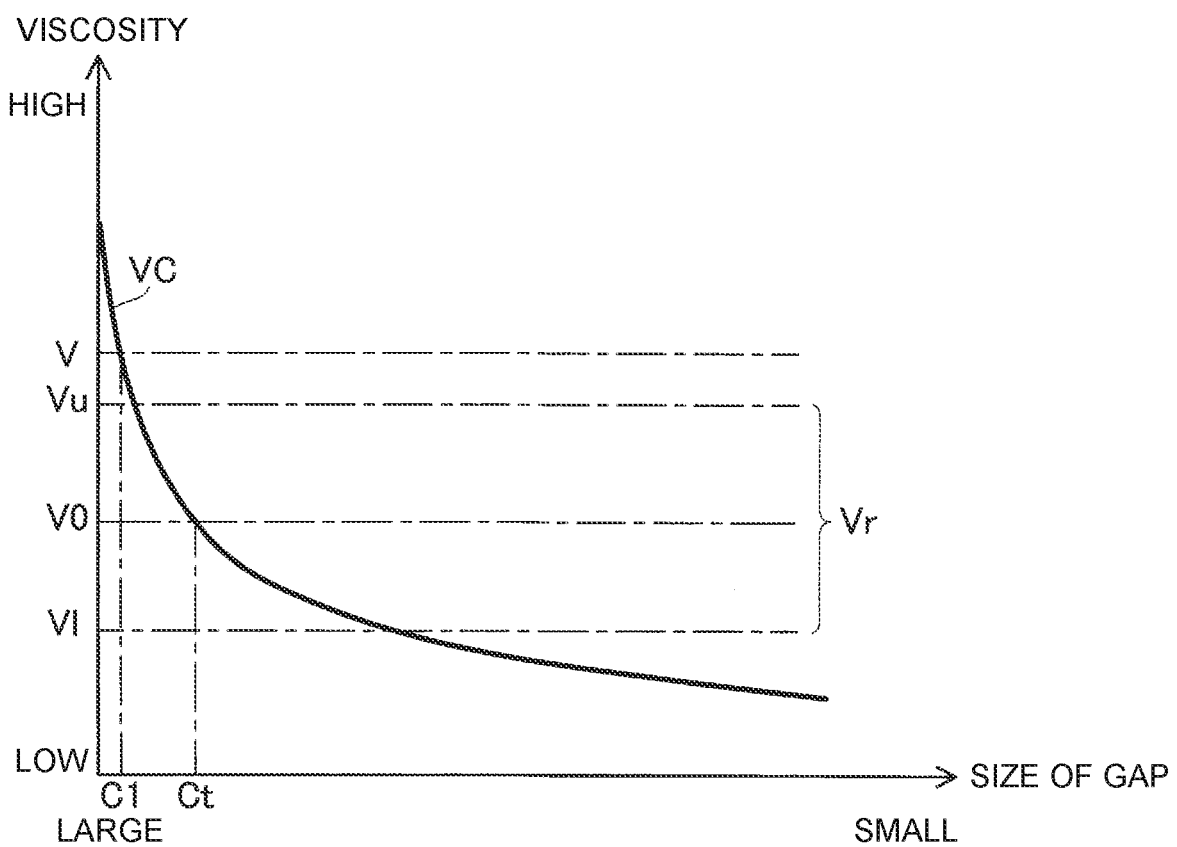
FIG. 7 is a view illustrating a relationship between a size of a gap and a viscosity.

FIG. 7 is a view to describe the set range for the viscosity of the kneading material at the detecting position of the viscosity detecting portion 60. In FIG. 7, a horizontal axis indicates a size of a gap and a vertical axis indicates the viscosity. The size of the gap shown on the horizontal axis of FIG. 7 is a size C1 of a gap between a housing 10 and the first paddle 22, 32 at a position of a movable portion 13 in the first thick-kneading zone C. Further, the viscosity shown on the vertical axis of FIG. 7 is the viscosity of the kneading material at the detecting position of the viscosity detecting portion 60.

Further, FIG. 7 illustrates a relationship VC between the size C1 of the gap and the viscosity of the kneading material at the detecting position of the viscosity detecting portion 60. From the relationship VC in FIG. 7, it is found that, as the size C1 of the gap is smaller, the viscosity of the kneading material tends to decrease. This is because, as the size C1 of the gap is smaller, a stronger shear force is applied to the kneading material.

Further, FIG. 7 illustrates a set range Vr for the viscosity of the kneading material at the detecting position of the viscosity detecting portion 60. The set range Vr is a target value of the viscosity of the kneading material at the detecting position of the viscosity detecting portion 60. That is, when the viscosity of the kneading material at the detecting position of the viscosity detecting portion 60 is set within the set range Vr, it is possible to eventually obtain a negative electrode paste having a target viscosity. Further, in FIG. 7, a lower limit value Vl, an upper limit value Vu, a medium value V0 of the set range Vr are shown. The set range Vr shown in FIG. 7 is stored in the storage portion 70.

Figure 8:
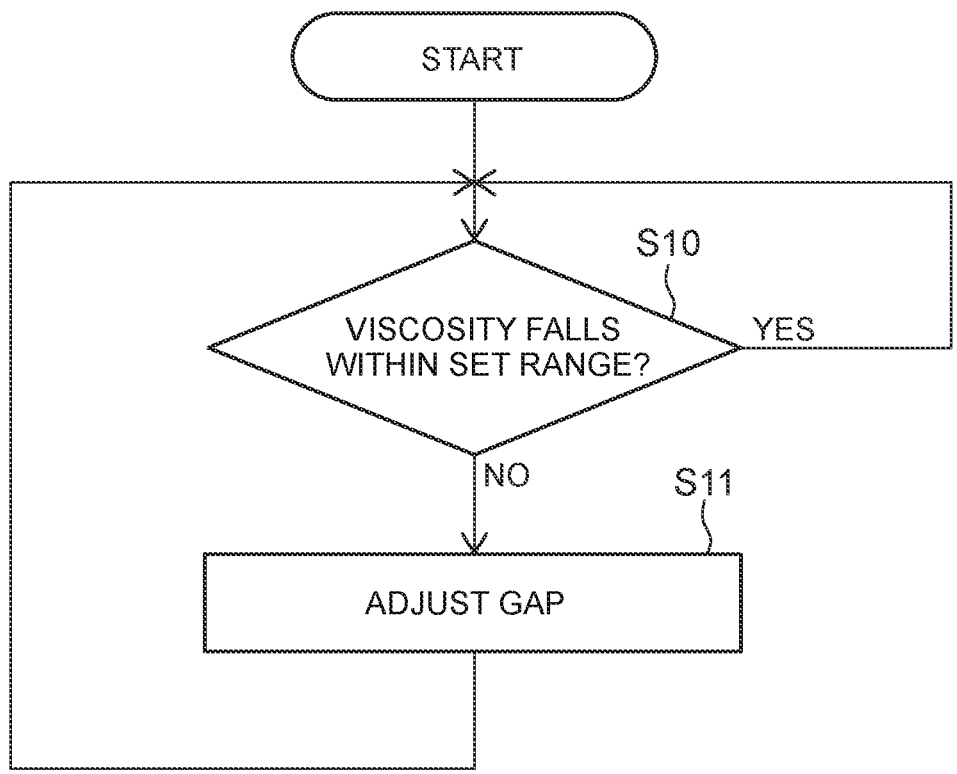
FIG. 8 is a view illustrating a procedure of adjusting a size of a gap in a negative electrode paste.

The adjustment portion 50 of the twin-screw extrusion kneader 2 of the present embodiment adjusts the position of the movable portion 13 based on the viscosity of the kneading material at the detecting position, detected by the viscosity detecting portion 60, and the set range Vr for the viscosity, which is acquired in advance and stored in the storage portion 70. FIG. 8 illustrates a procedure of the position adjustment of the movable portion 13 by the adjustment portion 50 at the time of manufacture of the negative electrode paste.

That is, it is first determined whether the viscosity of the kneading material, detected by the viscosity detecting portion 60, falls within the set range Vr stored in the storage portion 70 or not (S10). When the viscosity of the kneading material falls within the set range Vr (S10: YES), the twin-screw extrusion kneader 2 of the present embodiment continues the manufacture of the negative electrode paste while maintaining the size C1 of the gap between the first paddle 22, 32 and the inner wall surface 12 of the housing 10 in the first thick-kneading zone C as it is. That is, when the viscosity of the kneading material falls within the set range Vr, the adjustment portion 50 does not perform the position adjustment of the movable portion 13.

In the meantime, when the viscosity of the kneading material does not fall within the set range Vr (S10: NO), the adjustment portion 50 adjusts the size C1 of the gap between the first paddle 22, 32 and the inner wall surface 12 of the housing 10 in the first thick-kneading zone C (S11). That is, when the viscosity of the kneading material does not fall within the set range Vr (S10: NO), the adjustment portion 50 performs the position adjustment of the movable portion 13.

More specifically, when the viscosity of the kneading material at the detecting position is higher than the upper limit value Vu of the set range Vr, the adjustment portion 50 moves the movable portion 13 in a direction to approach the first paddle 22, 32, so as to decrease the size C1 of the gap. In the meantime, when the viscosity of the kneading material at the detecting position is lower than the lower limit value Vl of the set range Vr, the adjustment portion 50 moves the movable portion 13 in a direction to be distanced from the first paddle 22, 32, so as to increase the size C1 of the gap. Hereby, after the adjustment of the size C1 of the gap, the viscosity of the kneading material at the detecting position of the viscosity detecting portion 60 is adjusted so as to fall within the set range Vr.

At this time, it is preferable to adjust the gap with the medium value V0 in the set range Vr being taken as a target value. That is, for example, when a viscosity V detected by the viscosity detecting portion 60 is higher than the upper limit value Vu of the set range Vr as illustrated in FIG. 7, the adjustment portion 50 adjusts the size C1 of the gap with the medium value V0 of the set range Vr being taken as the target values, for example. That is, with reference to the relationship VC based on the viscosity V thus detected, a difference between the size C1 of the gap at the time when the viscosity V is detected and a size Ct of the gap at the medium value V0 can be calculated. Then, the adjustment portion 50 moves the movable portion 13 in the direction to approach the first paddle 22, 32 just by the difference.

As such, the twin-screw extrusion kneader 2 of the present embodiment performs the position adjustment of the movable portion 13 by the adjustment portion 50 along the procedure of FIG. 8, thereby making it possible to manufacture the negative electrode paste while uniformly maintaining the viscosity of the kneading material at the detecting position of the viscosity detecting portion 60. Accordingly, even if the abrasion of the paddle and the like occurs, the twin-screw extrusion kneader 2 of the present embodiment can manufacture the negative electrode paste at a uniform viscosity with a stable quality.

Further, materials supplied to the twin-screw extrusion kneader 2 may not necessarily have a uniform quality. That is, even if the size C1 of the gap between the first paddle 22, 32 and the housing 10 in the first thick-kneading zone C is maintained uniform, the viscosity of the kneading material at the detecting position of the viscosity detecting portion 60 may vary depending on the materials to be supplied. However, even if there is a variation in the quality of the materials to be supplied, the twin-screw extrusion kneader 2 of the present embodiment can maintain, at a uniform viscosity, the viscosity of the kneading material at the detecting position of the viscosity detecting portion 60. Hereby, even if there is a variation in the quality of the materials to be supplied, the twin-screw extrusion kneader 2 can manufacture the negative electrode paste at a uniform viscosity with a stable quality.

Further, in the twin-screw extrusion kneader 2 of the present embodiment, similarly to the first embodiment, even if the first paddle 22, 32 and the housing 10 are worn, the size C1 of the gap therebetween can be adjusted without replacing them. On this account, with the twin-screw extrusion kneader 2 of the present embodiment, it is also possible to reduce a running cost and to manufacture the negative electrode paste with a uniform quality for a long term. Further, it is also not necessary for the twin-screw extrusion kneader 2 of the present embodiment to replace the first paddle 22, 32 and the housing 10, so that the productivity of the negative electrode paste does not decrease. That is, with the twin-screw extrusion kneader 2 of the present embodiment, it is also possible to manufacture the negative electrode paste at a low cost while maintaining a high productivity.

Note that the above description deals with the twin-screw extrusion kneader 2 in which the structure of the movable portion 13, the adjustment portion 50, and the viscosity detecting portion 60 for adjusting the size C1 of the gap is provided only in the first thick-kneading zone C. However, also in the present embodiment, the size C1 of the gap between the first paddle 22, 32 and the housing 10 in other zones may be adjusted. Further, in the twin-screw extrusion kneader 2 of the present embodiment, the second paddle 23, 33 is also worn. Accordingly, a size C2 of a gap may be adjusted in terms of the second paddle 23, 33. Further, also in the present embodiment, the adjustment portion 50 is not limited to a converter 51 and a motor 52, but may be constituted by a cylinder and the like that works by a pneumatic pressure or a hydraulic pressure.

Further, the detecting position of the viscosity detecting portion 60 is naturally not limited to the first thick-kneading zone C. That is, as long as a value indicative of the viscosity of the kneading material kneaded at a position of the movable portion 13 can be detected, the viscosity of the negative electrode paste to be discharged may be detected, for example. Then, based on the viscosity of the negative electrode paste to be discharged, the position of the movable portion 13 is adjusted.

Further, the above description deals with a case where the size C1 of the gap is adjusted based on the viscosity of the kneading material, detected by the viscosity detecting portion 60. However, a value correlated with the viscosity of the kneading material can be used instead of the viscosity. Exemplary viscosity index values indicative of the viscosity of the kneading material include a temperature, a flow rate, a flow speed, and the like of the kneading material. That is, a detecting portion for detecting at least one of the viscosity index values such as the viscosity, the temperature, the flow rate, and the flow speed of the kneading material should be provided. In a case of the temperature of the kneading material, the temperature can be detected by a thermometer that is cheaper than a viscometer. Consequently, by use of the thermometer, the twin-screw extrusion kneader can be manufactured at a low cost. However, naturally, it is most preferable to detect the viscosity directly in order to adjust the viscosity of the kneading material.

Further, the abrasion of the first paddle 22, 32 and the housing 10 progresses more as the time to perform the kneading of the kneading material is longer. On this account, in a case where a degree of the change in the viscosity of the kneading material due to the variation in quality or temperature of the materials to be supplied is small enough to ignore with respect to a degree of the change in the viscosity of the kneading material along with the abrasion of the first paddle 22, 32 and the housing 10, a kneading time can be used as the viscosity index value. That is, in a case where the kneading time is used as the viscosity index value, the adjustment portion 50 should be configured to move the movable portion 13 in the direction to approach the first paddle 22, 32, as the kneading time is longer.

As specifically described above, the twin-screw extrusion kneader of the present embodiment includes the housing, two rotating shafts, and the rotational driving portion. Further, the twin-screw extrusion kneader includes the first paddle for kneading a kneading material supplied to the internal space of the housing. Furthermore, the twin-screw extrusion kneader includes the movable portion constituting a part of the housing. The movable portion includes an inner wall surface of the housing, the inner wall surface being opposed to the outer peripheral surface of the first paddle in a radial direction. The movable portion can be moved in a direction to approach the first paddle and a direction to be distanced therefrom. Accordingly, a size of a gap between the outer peripheral surface of the first paddle and the inner wall surface of the housing can be adjusted. Further, the negative electrode paste can be manufactured by using, as the kneading material, the active material, the binder, and the solvent for manufacturing the negative electrode paste. This can realize the twin-screw extrusion kneader that can adjust the size of the gap between the outer peripheral surface of the paddle and the inner wall surface of the housing, and the manufacturing method for an electrode paste therewith.

Note that the present embodiment is merely an example, and does not limit the present disclosure. Accordingly, it goes without saying that the present disclosure can be altered or modified variously within a range that does not deviate from the gist of the present disclosure. For example, the above embodiments deal with a case of manufacturing a negative electrode paste used to form a negative-electrode active material layer of a negative plate for a lithium-ion secondary battery. However, the above embodiments are also applicable to a positive electrode paste used to form a positive-electrode active material layer of a positive plate, and an electrode paste to be used in an electrode plate of a battery other than the lithium-ion secondary battery. Further, the twin-screw extrusion kneader according to the above embodiments is not limited to the manufacture of the electrode paste, but can be also used for kneading of other kneading materials.

What is claimed is:

1. A twin-screw extrusion kneader for kneading a kneading material supplied to an internal space of a housing, the twin-screw extrusion kneader comprising:
   two rotating shafts provided side by side in the internal space;
   a rotational driving portion configured to rotationally drive the rotating shafts;
   paddles provided in the rotating shafts and configured to rotate along with the rotating shafts so as to knead the kneading material;
   movable portions provided as members constituting a part of the housing, the part of the housing including an inner wall surface of the housing, the inner wall surface being opposed to radially outer peripheral surfaces of the paddles;
   position adjustment portions configured to perform position adjustment on the movable portions by moving the movable portions; and
   a viscosity index value output portion configured to output a viscosity index value indicative of a viscosity of the kneading material, wherein
   the paddles include a first paddle configured to apply a shear force to the kneading material and a second paddle configured to adjust a moving speed of the kneading material in a conveying direction of the kneading material in the internal space, the first paddle being provided on an upstream side of the second paddle in the conveying direction of the kneading material,
   the movable portions include an inner wall surface of the housing opposed to a radially outer peripheral surface of the first paddle, the movable portions being configured to move in a direction to approach the first paddle and in a direction to be distanced from the first paddle, and
   the position adjustment portions perform the position adjustment on the movable portions based on the viscosity index value output from the viscosity index value output portion,
   wherein
   the second paddle further comprises a first small paddle, a second small paddle, a first large paddle, and a second large paddle, wherein the first small paddle and the second small paddle are smaller than the first large paddle and the second large paddle,
   the first small paddle and the first large paddle are placed in an order that is reverse to an order of placement of the second small paddle and the second large paddle in the conveying direction, and
   gaps formed between the first and the second large paddles and the inner wall surface of the housing are smaller than gaps formed between the first and the second small paddles and the inner wall surface of the housing.

2. The twin-screw extrusion kneader according to claim 1, wherein
   the paddles are provided in a predetermined zone along an axial direction of the rotating shafts; and
   the movable portions are provided on an upstream side in a conveying direction of the kneading material in the predetermined zone.

3. The twin-screw extrusion kneader according to claim 1, wherein:
   when the viscosity of the kneading material at a detecting position is higher than an upper limit value of a set range, the position adjustment portions move the movable portions in the direction to approach the paddles so as to decrease a size of a gap between the housing and the paddles, and
   when the viscosity of the kneading material at the detecting position is lower than a lower limit value of the set range, the position adjustment portions move the movable portions in the direction to be distanced from the paddles so as to increase the size of the gap.

4. A manufacturing method for an electrode paste by use of a twin-screw extrusion kneader for kneading a kneading material supplied to an internal space of a housing, the manufacturing method comprising:
   manufacturing the electrode paste by the twin-screw extrusion kneader by use of an active material, a binder, and a solvent as the kneading material,
   the twin-screw extrusion kneader used in the manufacturing method including:
   two rotating shafts provided side by side in the internal space;
   a rotational driving portion configured to rotationally drive the rotating shafts;
   paddles provided in the rotating shafts and configured to rotate along with the rotating shafts so as to knead the kneading material; and
   movable portions provided as members constituting a part of the housing, the part of the housing including an inner wall surface of the housing, the inner wall surface being opposed to radially outer peripheral surfaces of the paddles, wherein
   the paddles include a first paddle configured to apply a shear force to the kneading material and a second paddle configured to adjust a moving speed of the kneading material in a conveying direction of the kneading material in the internal space, the first paddle being provided on an upstream side of the second paddle in the conveying direction of the kneading material,
   the movable portions include an inner wall surface of the housing opposed to a radially outer peripheral surface of the first paddle, the movable portions being configured to move in a direction to approach the first paddle and in a direction to be distanced from the first paddle,
   the twin-screw extrusion kneader used in the manufacturing method includes position adjustment portions configured to perform position adjustment on the movable portions by moving the movable portions, and
   a viscosity index value output portion configured to output a viscosity index value indicative of a viscosity of the kneading material; and
   the position adjustment portions perform the position adjustment on the movable portions based on the viscosity index value output from the viscosity index value output portion,
   wherein
   the second paddle further comprises a first small paddle, a second small paddle, a first large paddle, and a second large paddle, wherein the first small paddle and the second small paddle are smaller than the first larger paddle and the second large paddle, the first small paddle and the first large paddle are placed in an order that is reverse to an order of placement of the second small paddle and the second large paddle in the conveying direction, and gaps formed between the first and the second large paddles and the inner wall surface of the housing are smaller than gaps formed between the first and the second small paddles and the inner wall surface of the housing.

5. The manufacturing method for the electrode paste, according to claim 4, wherein:

the twin-screw extrusion kneader used in the manufacturing method is configured such that the paddles are provided in a predetermined zone along an axial direction of the rotating shafts, and the movable portions are provided on an upstream side in a conveying direction of the kneading material in the predetermined zone.

6. The manufacturing method for the electrode paste, according to claim 4, wherein:

when the viscosity of the kneading material at a detecting position is higher than an upper limit value of a set range, the position adjustment portions move the movable portions in the direction to approach the paddles so as to decrease a size of a gap between the housing and the paddles, and when the viscosity of the kneading material at the detecting position is lower than a lower limit value of the set range, the position adjustment portions move the movable portions in the direction to be distanced from the paddles so as to increase the size of the gap.

* * * * *